US007052160B1

(12) United States Patent
Chang

(10) Patent No.: US 7,052,160 B1
(45) Date of Patent: May 30, 2006

(54) REFLECTIVE MECHANISM FOR STAGE LAMP

(76) Inventor: Ming-Cheng Chang, No. 23, Kejih 1st Rd., Yungkang, Tainan Hsien (TW)

( * ) Notice: Subject to any disclaimer, the term of this patent is extended or adjusted under 35 U.S.C. 154(b) by 5 days.

(21) Appl. No.: 10/994,628

(22) Filed: Nov. 22, 2004

(51) Int. Cl.
*B60Q 1/14* (2006.01)

(52) U.S. Cl. ........................ 362/284; 362/324; 359/877

(58) Field of Classification Search ................ 359/877; 362/284
See application file for complete search history.

(56) References Cited

U.S. PATENT DOCUMENTS 4,210,385 A * 7/1980 Baudot ........................ 359/555
5,590,955 A * 1/1997 Bornhorst et al. .......... 362/324
6,461,021 B1 * 10/2002 Warnecke ................... 362/282
6,764,198 B1 * 7/2004 Chang ........................ 362/269

* cited by examiner

*Primary Examiner*—Mark A. Robinson
*Assistant Examiner*—Scott H Stephens
(74) *Attorney, Agent, or Firm*—Alan D. Kamrath; Nikolai & Mersereau, P.A.

(57) ABSTRACT

A reflective mechanism includes a base fixed on a support member of a stage lamp, a bracket fixed on the base, a mirror frame, and a reflective mirror mounted on the mirror frame. A hollow shaft rotatably extends through an axial hole of the base and includes a fork on an end thereof. The hollow shaft is driven by a first motor mounted on the base to turn about a longitudinal axis of the hollow shaft. The mirror frame includes a pivotal portion pivotally mounted to the fork of the hollow shaft. The pivotal portion of the mirror frame is driven by a second motor to pivot through transmission by an endless cord that extends through the hollow shaft without interfering with rotation of the hollow shaft.

10 Claims, 9 Drawing Sheets

REFLECTIVE MECHANISM FOR STAGE LAMP

BACKGROUND OF THE INVENTION

1. Field of the Invention

The present invention relates to a reflective mechanism for a stage lamp. In particular, the present invention relates to a reflective mechanism for a stage lamp that includes a rotatable reflective mirror.

2. Description of the Related Art

A stage lamp provides colorful light effects for a stage. FIG. 1 of the drawings illustrates a conventional stage lamp and FIG. 2 is an exploded perspective view of a reflective mechanism of the conventional stage lamp. The stage lamp includes a body 1, a light source 11 mounted in the body 1, a lens 12 mounted in the body 1, and a reflective mechanism 2. The reflective mechanism 2 includes a fixed frame 24 mounted on the body 1, a rotary frame 25, a first motor 21 mounted on the fixed frame 24 for rotating the rotary frame 25, a mirror frame 26, a reflective mirror 23 mounted on the mirror frame 26, and a second motor 22 mounted on the rotary frame 25 for rotating the mirror frame 26.

When the first motor 21 turns, the rotary frame 25 rotates such that the reflective mirror 23 rotates about an axis parallel to an incident light from the light source 11. When the second motor 22 turns, the reflective mirror 23 rotates about an axis transverse to the axis. Thus, various light effects can be obtained. However, the first motor 21 must have a large horsepower for driving the rotary frame 25 carrying the second motor 22 and the mirror frame 26. Further, the rotary frame 25 and the mirror frame 26 are continuously changing their speed and direction such that both of the first motor 21 and the second motor 22 must have a large horsepower to overcome the rotational inertia. Further, positioning of the second motor 22 on the rotary frame 25 is not easy, as the rotary frame 25 rotates frequently when in use.

SUMMARY OF THE INVENTION

In accordance with a first aspect of the present invention, a reflective mechanism is provided for a stage lamp including a body and a support member mounted on the body. The reflective mechanism comprises a base fixed on the support member, a first motor mounted to the base and including an output shaft with a first gear, a first transmission device, a bracket including a bottom fixed on the base and a wall extending from the bottom, a second motor mounted on the wall of the bracket and including an output shaft with a second gear, a second transmission device, a mirror frame, and a reflective mirror mounted on a bottom plate of the mirror frame to turn therewith.

The first transmission device includes a hollow shaft rotatably extending through an axial hole of the base and a first driven gear mounted on the hollow shaft to turn therewith. The first driven gear is meshed with and driven by the first gear. The hollow shaft further includes a fork on an end thereof. The second transmission device includes an endless cord and a second driven gear meshed with the second gear. The second driven gear includes a pulley extending from a side thereof.

The mirror frame includes a pivotal portion pivotally mounted to the fork of the hollow shaft. The endless cord is wound around the pulley and the pivotal portion of the mirror frame, allowing joint rotation of the mirror frame and the second driven gear. The endless cord extends through the hollow shaft without interfering with rotation of the hollow shaft.

When the first motor turns, the mirror frame together with reflective mirror rotates about a longitudinal axis of the hollow shaft. When the second motor turns, the mirror frame together with the reflective mirror pivots about a pivotal axis of the pivotal portion.

Preferably, the longitudinal axis of the hollow shaft is parallel to an incident light from a light source mounted in the body of the stage lamp, and the pivotal axis of the pivotal portion is orthogonal to the longitudinal axis of the hollow shaft.

In an embodiment of the invention, the first driven gear of the first transmission device includes a plurality of inner teeth. The first transmission device further includes a third gear securely mounted on the hollow shaft to turn therewith. The third gear includes a plurality of outer teeth for securely engaging with the inner teeth of the first driven gear to turn therewith.

The third gear includes a groove in a side thereof. The base includes a restraining member received in the groove of the third gear, limiting joint rotational movement of the third gear and the hollow shaft, thereby limiting joint rotational movement of the mirror frame and the reflective mirror.

The pivotal portion of the mirror includes two spaced stops for limiting pivotal movement of the mirror frame and the reflective mirror.

Each of the pulley and the pivotal portion of the mirror frame includes an annular groove. The endless cord is wound around the annular groove of the pulley and the annular groove of the pivotal portion.

The fork of the hollow shaft includes two spaced branches, and two tensioning rollers are rotatably mounted between the branches for guiding and tensioning the endless cord.

The branches of the fork of the hollow shaft include aligned holes, and the pivotal portion includes a hole. A pin extends through the aligned holes of the fork and the hole of the pivotal portion.

By such an arrangement, the reflective mirror in accordance with the present invention can be driven with low-horsepower motors, as the rotational inertia to be overcome is much smaller as compared to the conventional design.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
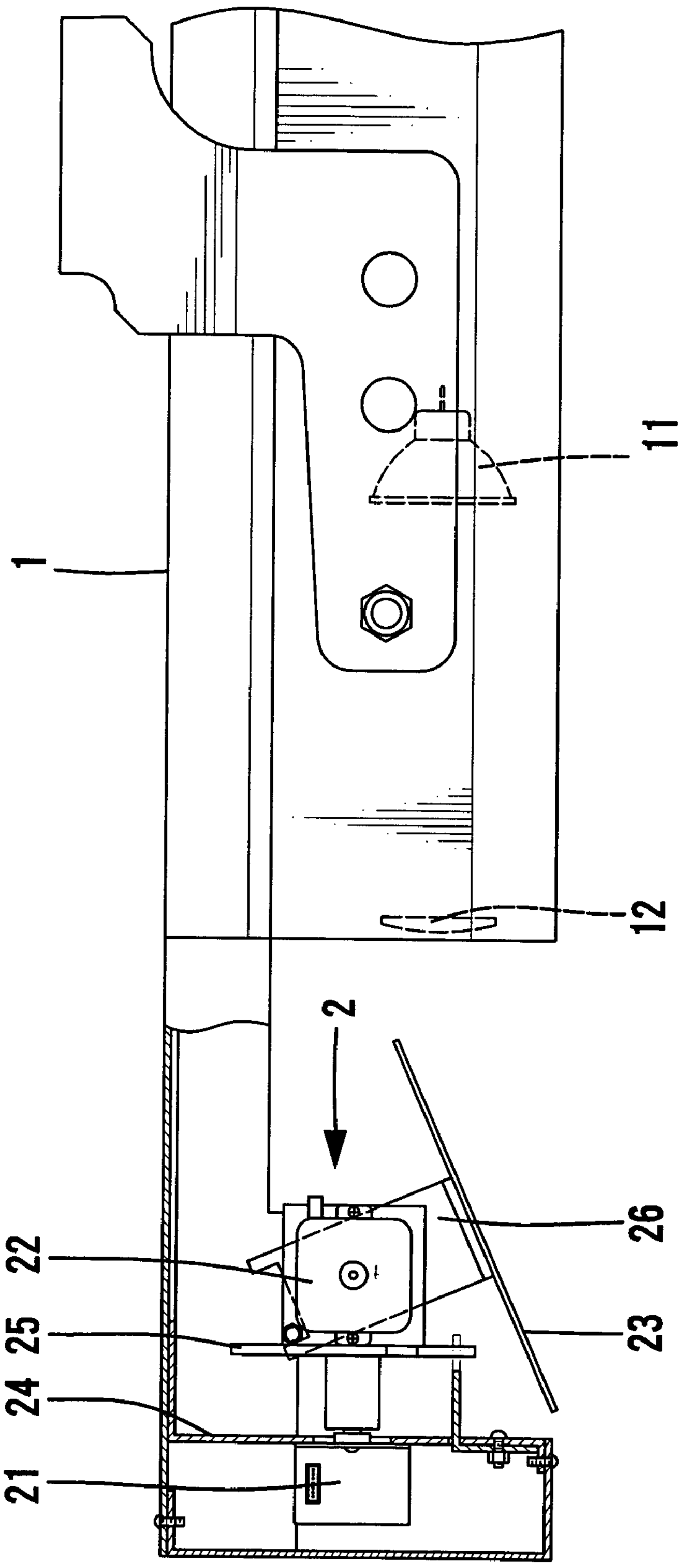
FIG. 1 PRIOR ART
FIG. 1 is a partly sectioned side view of a conventional stage lamp.
Figure 2:
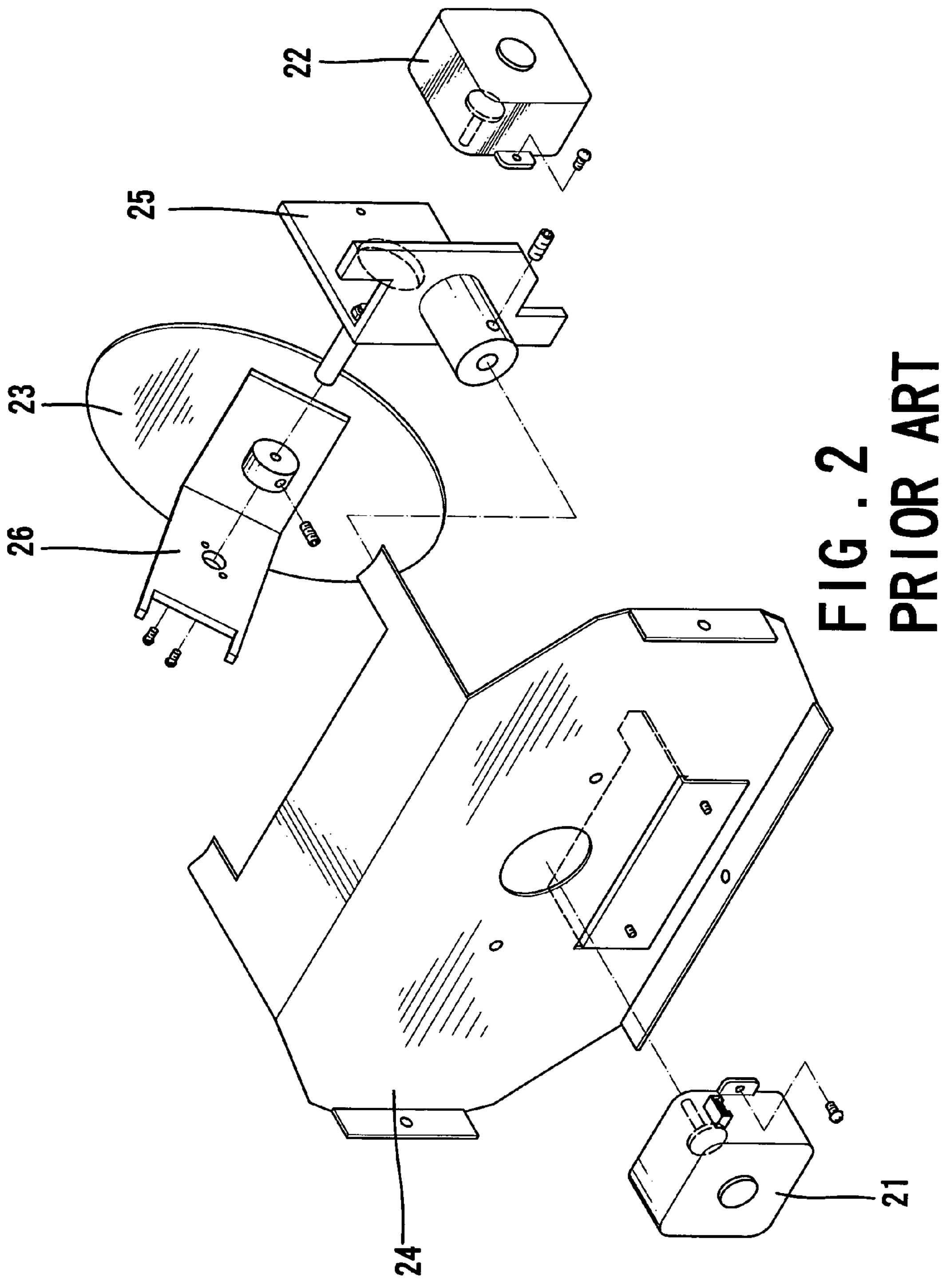
FIG. 2 PRIOR ART
FIG. 2 is an exploded perspective view of a reflective mechanism of the conventional stage lamp.
Figure 3:
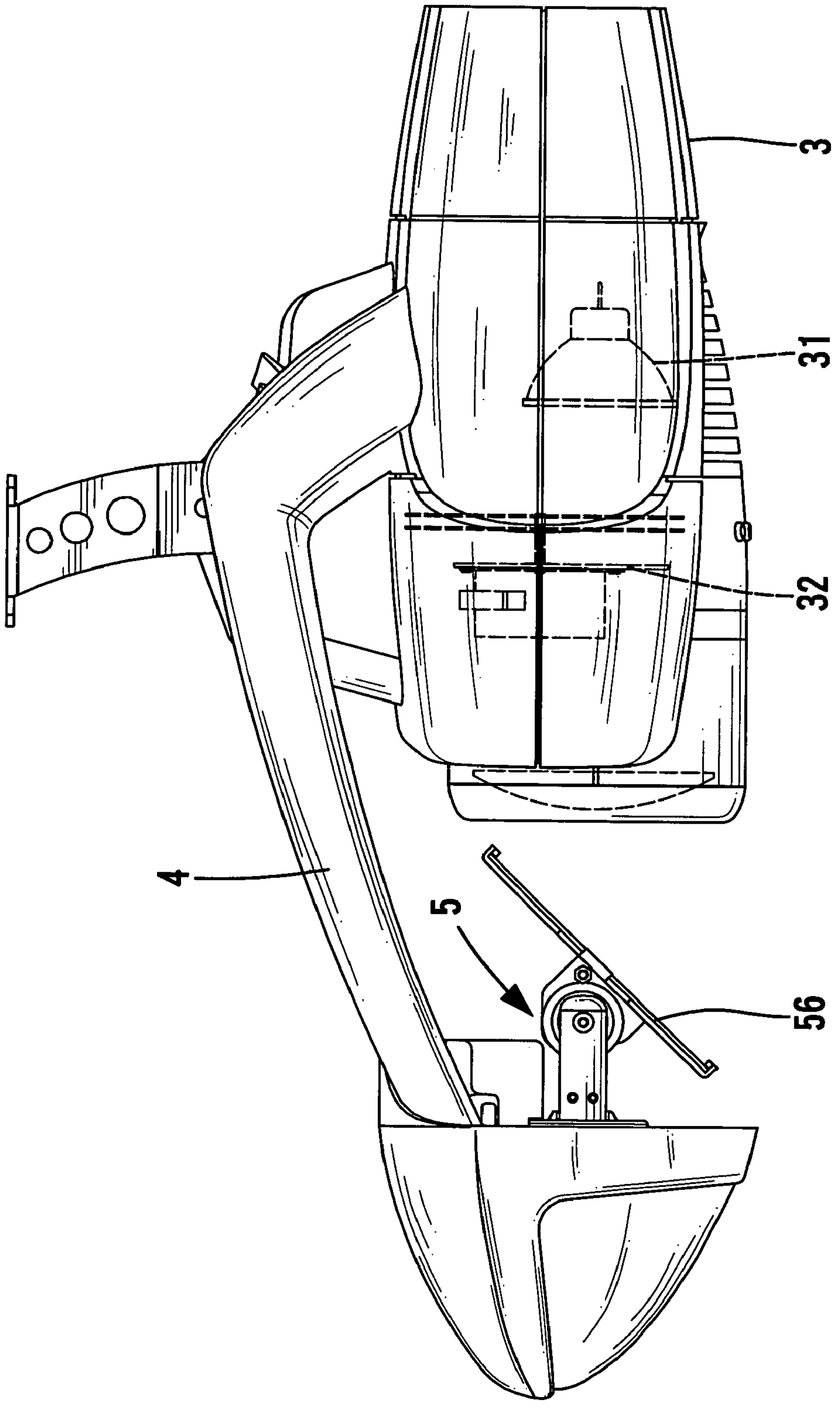
FIG. 3 is a side view of a stage lamp with a reflective mechanism in accordance with the present invention.

Referring to FIGS. 3 through 6, a stage lamp in accordance with the present invention comprises a body 3, a support member 4 including an end fixedly mounted to the body 3, and a reflective mechanism 5 mounted to the other end of the support member 4. A light source 31 and a rotary disc 32 carrying at least one pattern are mounted in the body 3. A light beam from the light source 31 passing through a lens (not labeled) and the rotary disc 32 is incident on the reflective mirror 56 of the reflective mechanism 5 and reflected therefrom. The internal structure of the body 3 is conventional and therefore not further described.

The reflective mechanism 5 comprises a base 51 fixed on the support member 4, a bracket 57 fixed on the base 51, a first motor 52 mounted on the base 51, a second motor 58 mounted on the bracket 57, a first transmission device 53 connected to and driven by the first motor 52, a second transmission device 54 connected to and driven by the second motor 58, a mirror frame 55, and the above-mentioned reflective mirror 56 mounted on the mirror frame 55.

Figure 6:
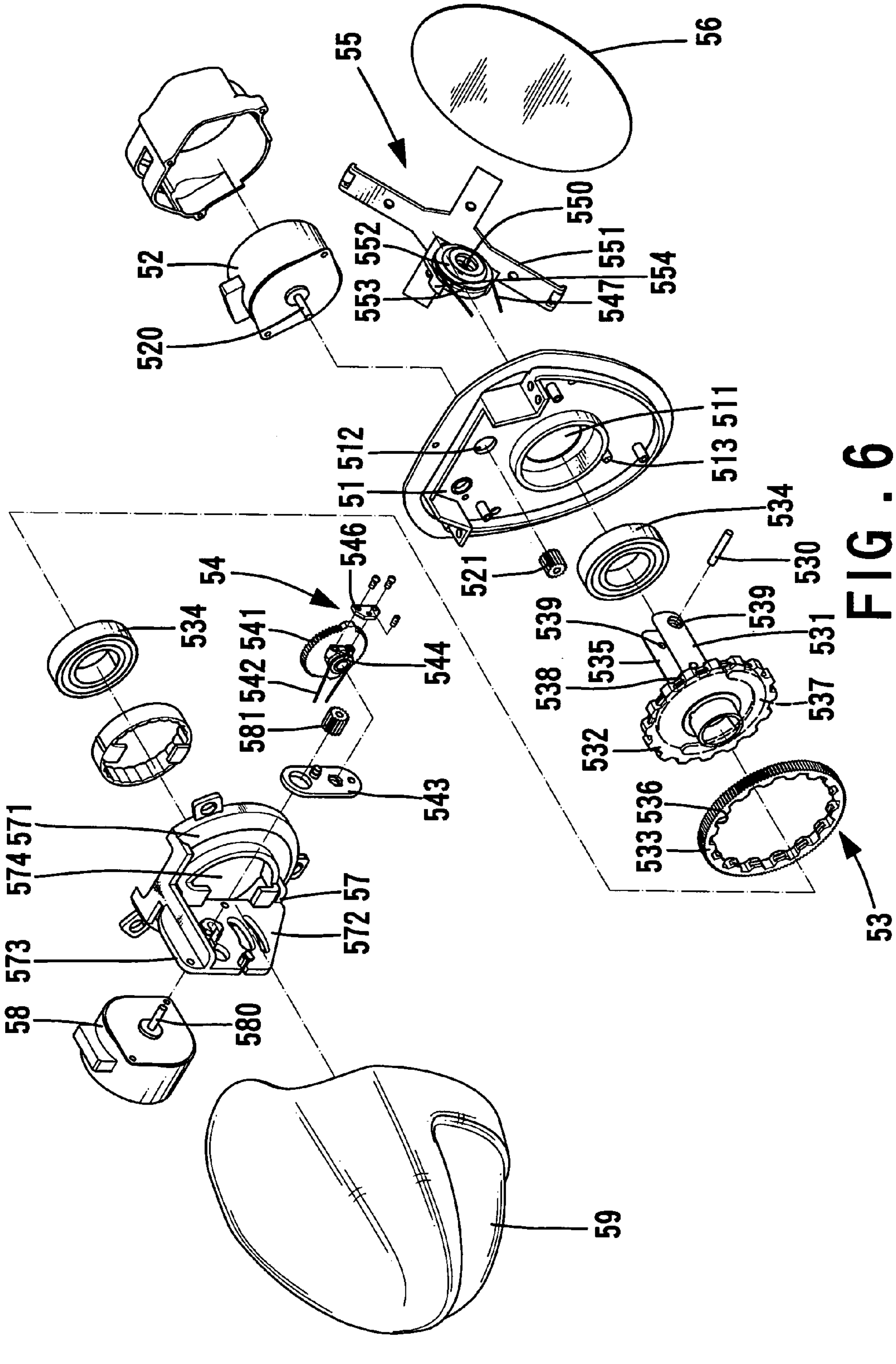
FIG. 6 is an exploded perspective view of the reflective mechanism in accordance with the present invention.

As illustrated in FIG. 6, the base 51 includes an axial hole 511 in a central portion thereof and a mounting hole 512. A casing 59 is attached to the base 51 for housing most of the elements. The first motor 52 includes an output shaft 520 extending through the mounting hole 512, and a gear 512 is securely mounted on the output shaft 520 of the first motor 52 to turn therewith.

The first transmission device 53 comprises a hollow shaft 531 rotatably extending through the axial hole 511, a gear 532 securely mounted on the hollow shaft 531 to turn therewith, and a driven gear 533. In this illustrated embodiment, the driven gear 533 includes a plurality of inner teeth 536 for securely engaging with outer teeth (not labeled) of the gear 532 to turn therewith. Further, the driven gear 533 meshes with and thus driven by the gear 521 of the first motor 52. Thus, when the first motor 52 turns, the hollow shaft 531 rotates about a longitudinal axis thereof. Preferably, the longitudinal axis of the hollow shaft 531 is parallel to the incident light from the light source 31. Bearings 534 are mounted between the hollow shaft 531 and a peripheral wall delimiting the axial hole 511 to allow smooth rotation.

Figure 7:
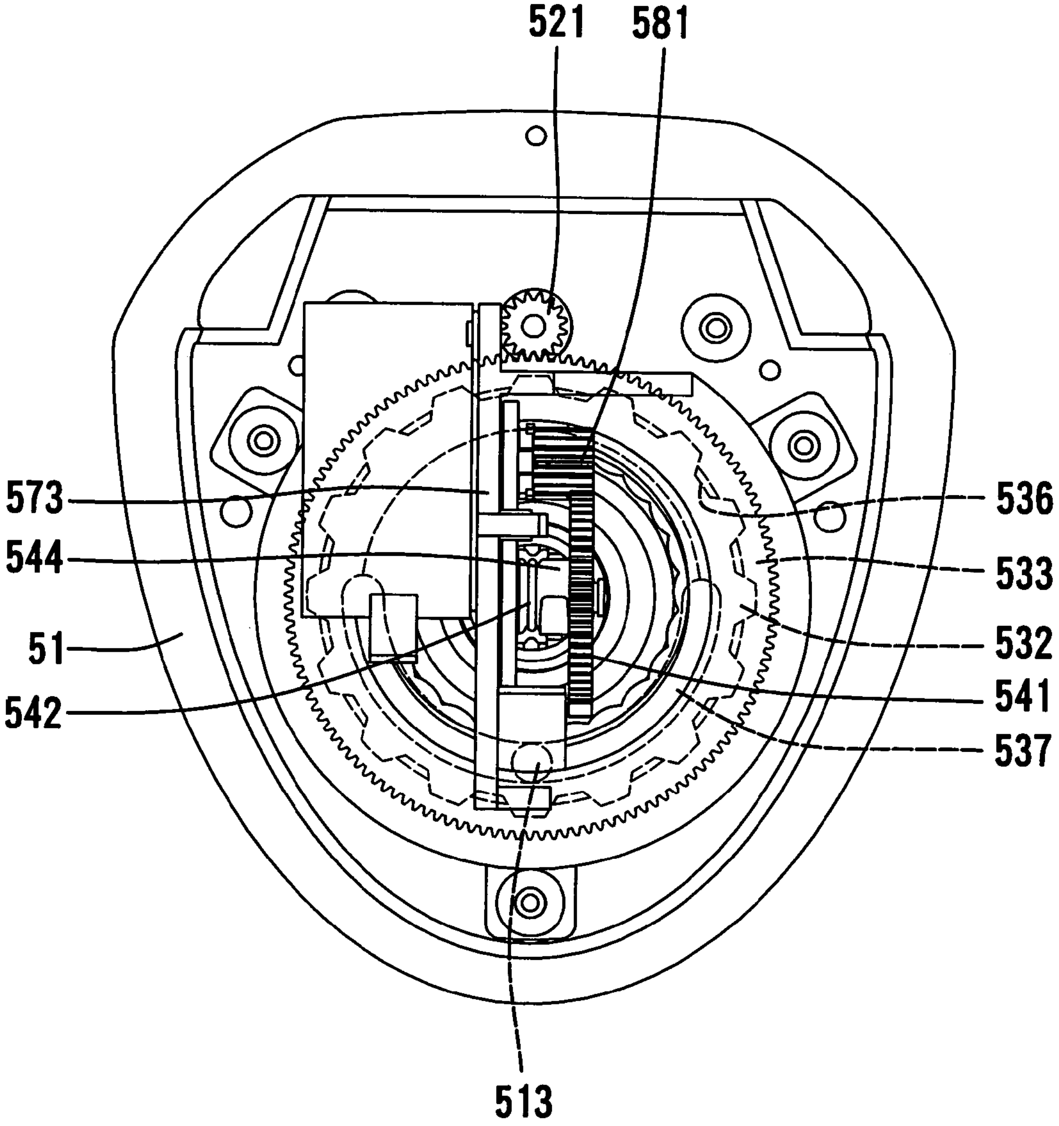
FIG. 7 is a side view of the reflective mechanism in FIG. 4, wherein a casing of the reflective mechanism is removed to show interior structure.

The gear 532 includes a groove 537 in a side thereof. Referring to FIG. 7, a restraining member 513 is mounted on the base 51 and received in the groove 537 to restrain rotational movement of the gear 532. Namely, further joint rotation of the gear 532 and the hollow shaft 531 is not allowed when one of two end walls delimiting the groove 537 comes in contact with the restraining member 513. Further, the restraining member 513 forms a starting point for the hollow shaft 531.

The bracket 57 includes a bottom 571 fixed on the base 51 and a wall 572 extending upright from the bottom 571. The bottom 571 includes an axial hole 574, and the wall 572 includes a mounting hole 573. The second motor 58 includes an output shaft 580 rotatably extending through the mounting hole 573. A gear 581 is mounted on the output shaft 580 to turn therewith.

The second transmission device 54 includes a driven gear 541 that meshes with and is driven by the gear 581 of the second motor 58. The second transmission device 54 further includes an endless cord 542. The driven gear 541 is rotatably supported by a plate 543 that is fixed to the wall 572. A pulley 544 extends from a side of the gear 541 and includes an annular groove (not labeled) around which a portion 545 of the endless cord 542 is wound. A further plate 546 is mounted to the pulley 544 to prevent the endless cord 542 from slipping.

The mirror frame 55 includes a bottom plate 551 on which the reflective mirror 56 is securely mounted. The mirror frame 55 further includes a pivotal portion 552 extending from the bottom plate 551 and pivotally connected with an end of the hollow shaft 531. In this illustrated embodiment, the end of the hollow shaft 531 includes a fork 535 having two branches (not labeled) between which the pivotal portion 552 is mounted, with a pin 530 extending through a hole 550 of the pivotal portion 552 of the mirror frame 55 and aligned holes 539 of the branches. The pivotal portion 552 of the mirror frame 55 further includes an annular groove 553 around which another portion 547 of the endless cord 542 is wound. Thus, when the second motor 58 turns, the reflective frame 55 and the reflective mirror 56 turns about a pivotal axis of the pin 530 through transmission by the driven gear 541 and the endless cord 542. It is noted that the endless cord 542 extends through the hollow shaft 531 without interfering with rotation of the hollow shaft 531.

Figure 4:
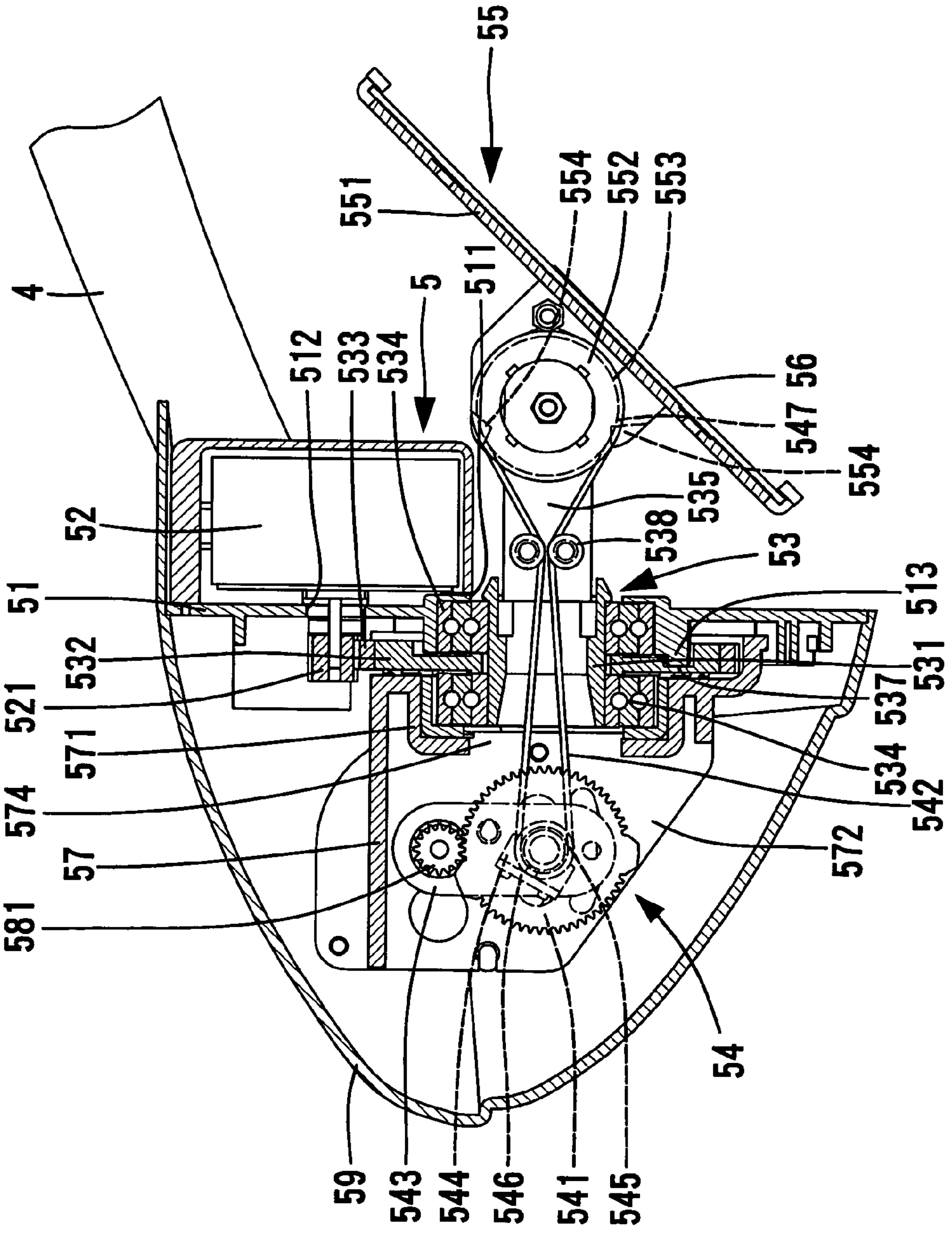
FIG. 4 is a sectional view of the reflective mechanism in accordance with the present invention.
Figure 5:
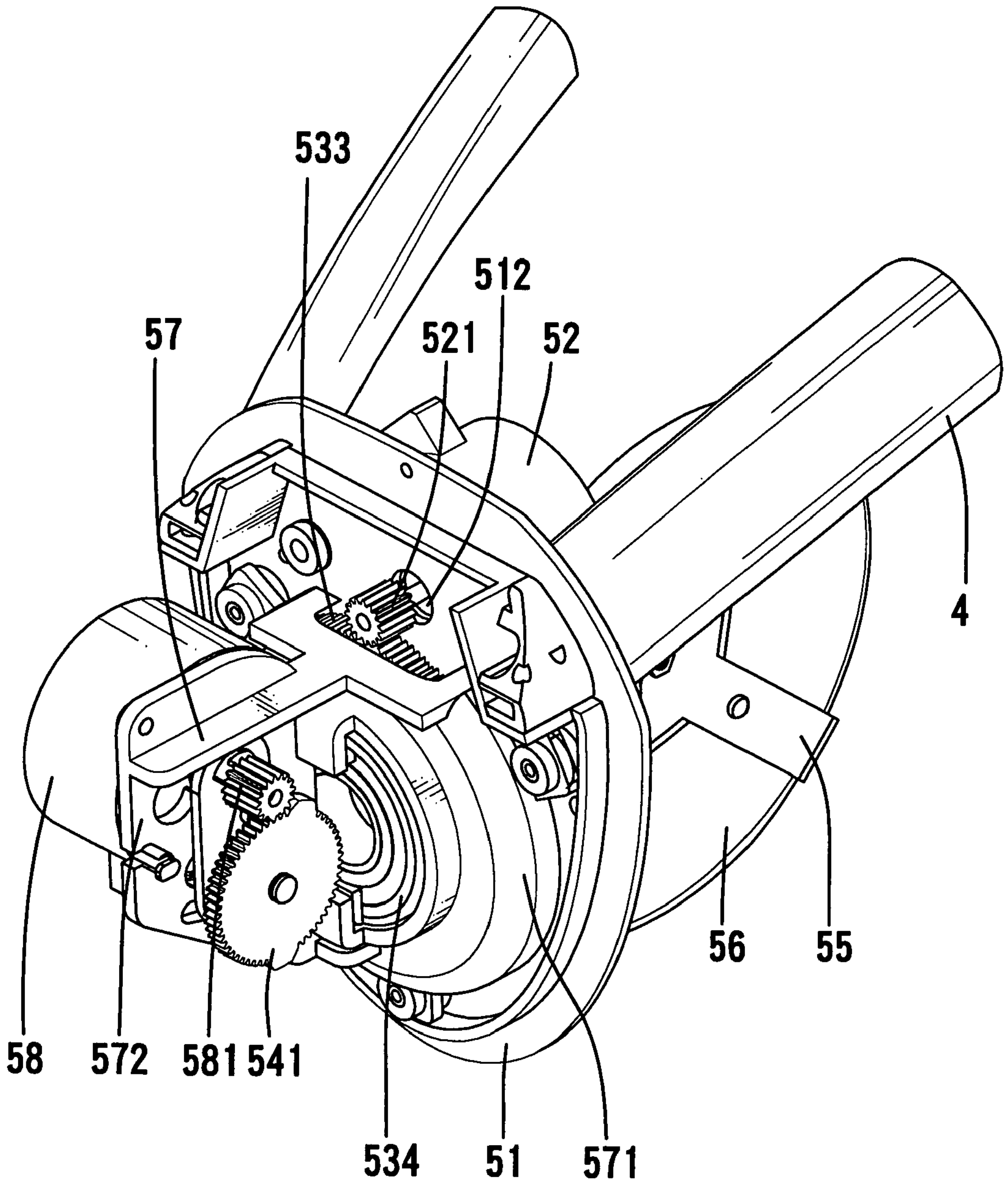
FIG. 5 is a perspective view of the reflective mechanism in accordance with the present invention, wherein a casing is removed to show an interior structure thereof.

As illustrated in FIG. 4, two tensioning rollers 538 are rotatably mounted between the branches of the fork 535 for guiding and tensioning the endless cord 542. The pivotal portion 554 further includes two spaced stops 554 to limit rotational angle of the mirror frame 55. Namely, further rotation of the mirror frame 55 is not allowed when any one of the stops 554 comes in contact with the fork 535. Further, each stops 554 forms a starting point for the mirror frame 55.

Figure 8:
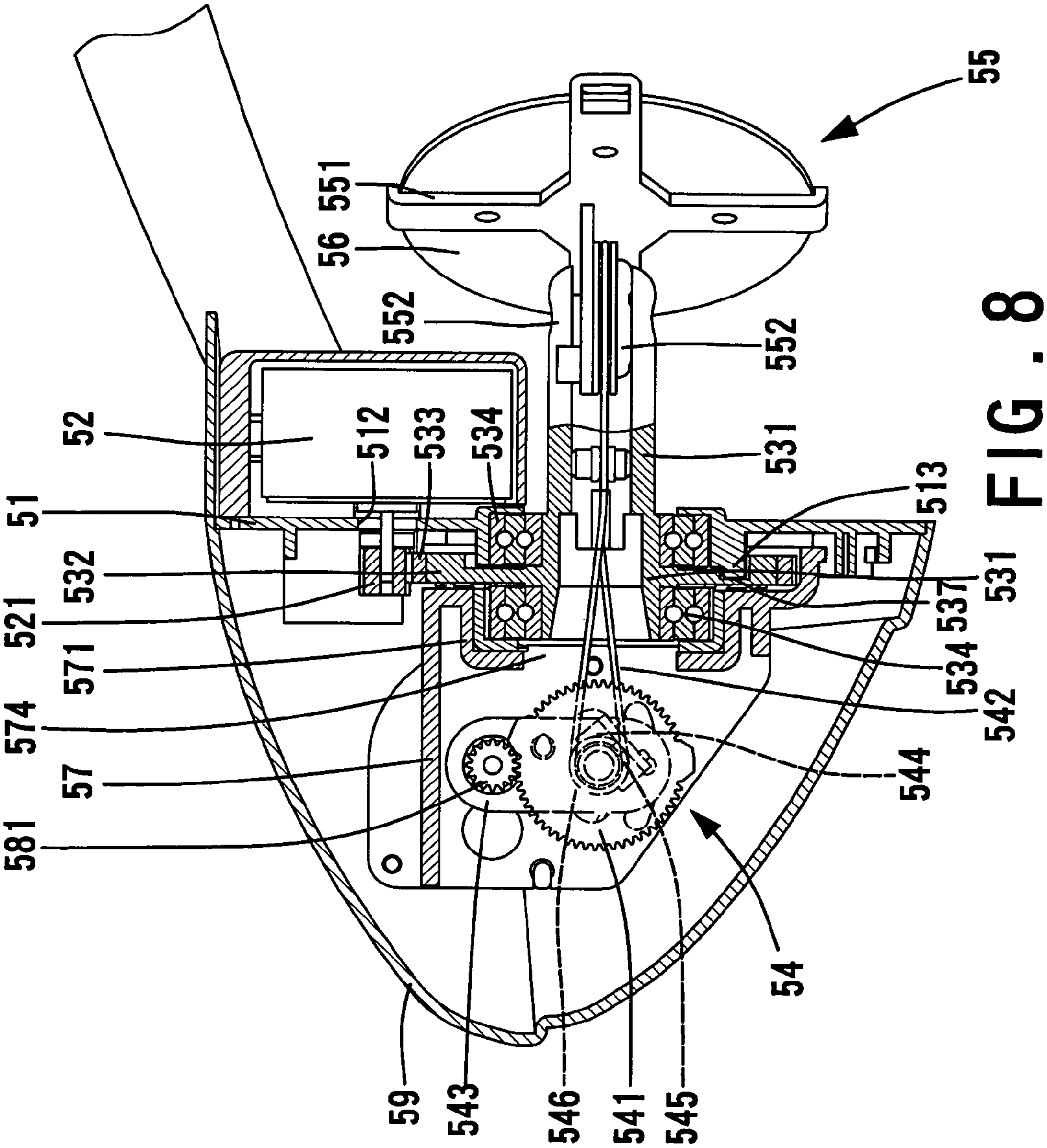
FIG. 8 is a sectional view similar to FIG. 4, illustrating rotation of a reflective mirror in a direction.
Figure 9:
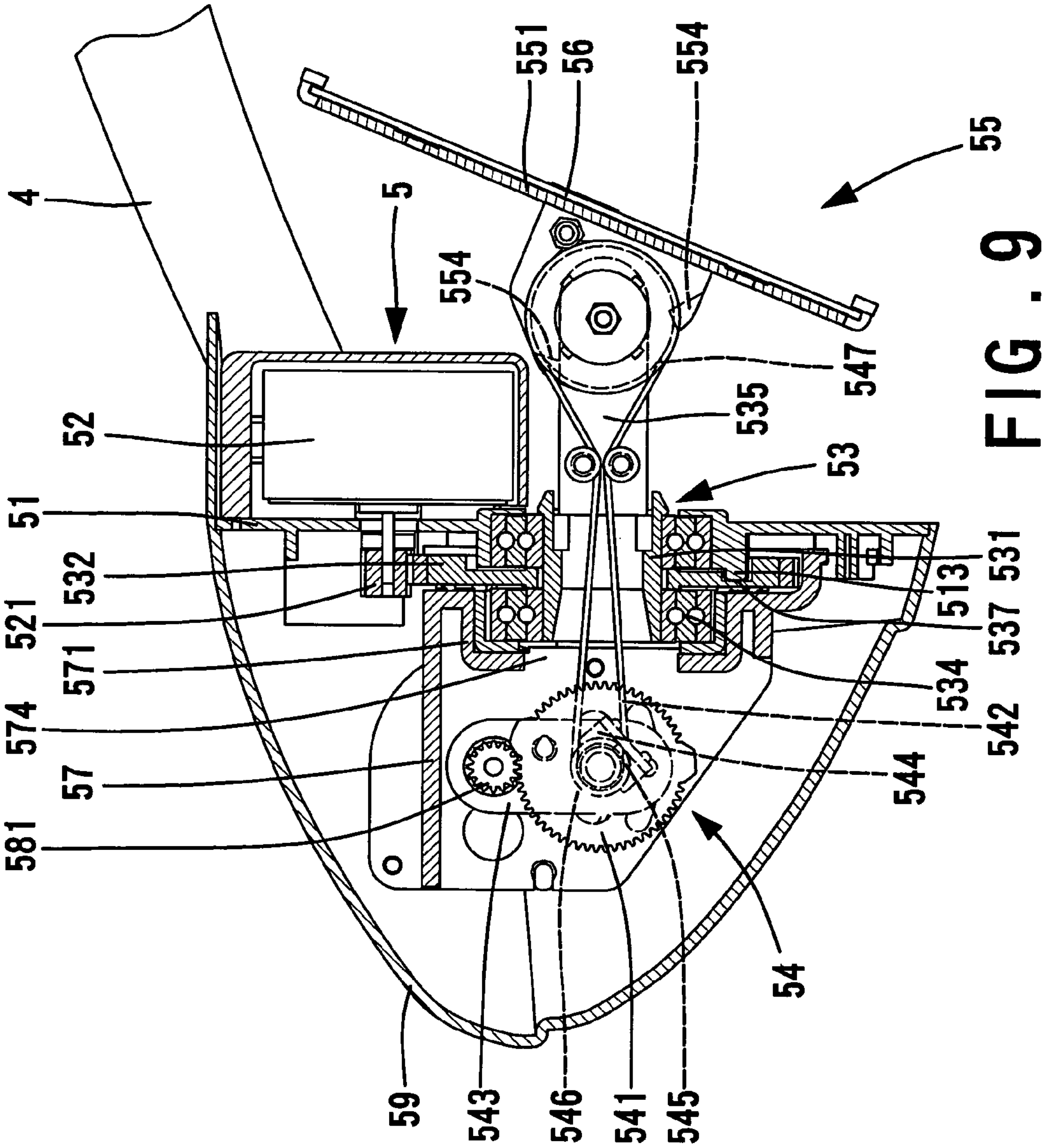
FIG. 9 is a sectional view similar to FIG. 4, illustrating rotation of the reflective mirror in an orthogonal direction.

Referring to FIGS. 4 and 8, when the first motor 52 turns, the mirror frame 55 together with the reflective mirror 56 turns about the longitudinal axis of the hollow shaft 531 through transmission by the driven gear 533, the gear 532, and the hollow shaft 531 of the first transmission device 53. Referring to FIGS. 4 and 9, when the second motor 58 turns, by transmission of the driven gear 541 and the endless cord 542 of the second transmission device 54, the mirror frame 55 together with the reflective mirror 56 pivots about the pivotal axis of the pin 530 that is orthogonal to the longitudinal axis of the hollow shaft 531. Various light effects are provided through various reflective angles of the reflective mirror 56.

Since the first transmission device 53 and the second transmission device 54 are independent from each other and since the rotational inertia of the reflective mirror 56 is small, the load of each of the first motor 52 and the second motor 58 is small. Thus, low-horsepower motors can be used. Further, there is no need to increase the horsepower of the first motor 52, as the second motor 58 causes no load to the first motor 52. Further, loosening of the second motor 58 is less likely to occur.

Although a specific embodiment has been illustrated and described, numerous modifications and variations are still possible without departing from the essence of the invention. The scope of the invention is limited by the accompanying claims.

What is claimed is:

1. A reflective mechanism for a stage lamp, the stage lamp including a body and a support member mounted on the body, the reflective mechanism comprising:

a base fixed on the support member, the base including an axial hole;

a first motor mounted to the base, the first motor including an output shaft with a first gear;

a first transmission device including a hollow shaft rotatably extending through the axial hole of the base and a first driven gear mounted on the hollow shaft to turn therewith, the first driven gear being meshed with and driven by the first gear, the hollow shaft further including a fork on an end thereof;

a bracket including a bottom fixed on the base and a wall extending from the bottom;

a second motor mounted on the wall of the bracket, the second motor including an output shaft with a second gear;

a second transmission device including an endless cord and a second driven gear meshed with the second gear, the second driven gear including a pulley extending from a side thereof;

a mirror frame including a bottom plate and a pivotal portion, the pivotal portion being pivotally mounted to the fork of the hollow shaft, the endless cord being wound around the pulley and the pivotal portion of the mirror frame, allowing joint rotation of the mirror frame and the second driven gear, the endless cord extending through the hollow shaft without interfering with rotation of the hollow shaft; and a reflective mirror mounted on the bottom plate of the mirror frame to turn therewith;

wherein when the first motor turns, the mirror frame together with reflective mirror rotates about a longitudinal axis of the hollow shaft; and wherein when the second motor turns, the mirror frame together with the reflective mirror pivots about a pivotal axis of the pivotal portion.

2. The reflective mechanism for a stage lamp as claimed in claim 1, with the longitudinal axis of the hollow shaft being parallel to an incident light from a light source mounted in the body of the stage lamp.

3. The reflective mechanism for a stage lamp as claimed in claim 1, with the pivotal axis of the pivotal portion being orthogonal to the longitudinal axis of the hollow shaft.

4. The reflective mechanism for a stage lamp as claimed in claim 1, with the first driven gear of the first transmission device including a plurality of inner teeth, with the first transmission device further including a third gear securely mounted on the hollow shaft to turn therewith, and with the third gear including a plurality of outer teeth for securely engaging with the inner teeth of the first driven gear to turn therewith.

5. The reflective mechanism for a stage lamp as claimed in claim 4, with the third gear including a groove in a side thereof, with the base including a restraining member received in the groove of the third gear, limiting joint rotational movement of the third gear and the hollow shaft, thereby limiting joint rotational movement of the mirror frame and the reflective mirror.

6. The reflective mechanism for a stage lamp as claimed in claim 1, with the pivotal portion of the mirror including two spaced stops for limiting pivotal movement of the mirror frame and the reflective mirror.

7. The reflective mechanism for a stage lamp as claimed in claim 1, with the pulley including an annular groove, with the pivotal portion of the mirror frame including an annular groove, and with the endless cord being wound around the annular groove of the pulley and the annular groove of the pivotal portion.

8. The reflective mechanism for a stage lamp as claimed in claim 1, with the fork of the hollow shaft including two spaced branches, and with two tensioning rollers rotatably mounted between the branches for guiding and tensioning the endless cord.

9. The reflective mechanism for a stage lamp as claimed in claim 8, with the fork of the hollow shaft including two spaced branches having aligned holes, with the pivotal portion including a hole, with the reflective mechanism further including a pin extending through the aligned holes of the fork and the hole of the pivotal portion.

10. The reflective mechanism for a stage lamp as claimed in claim 1, with the fork of the hollow shaft including two spaced branches having aligned holes, with the pivotal portion including a hole, with the reflective mechanism further including a pin extending through the aligned holes of the fork and the hole of the pivotal portion.

* * * * *